(12) United States Patent
Cooke

(10) Patent No.: US 8,590,247 B2
(45) Date of Patent: Nov. 26, 2013

(54) CEILING ANCHORING DEVICE WITH LOCKING RAIL SYSTEM

(76) Inventor: Duke Ellington Cooke, Los Angeles, CA (US)

( * ) Notice: Subject to any disclaimer, the term of this patent is extended or adjusted under 35 U.S.C. 154(b) by 414 days.

(21) Appl. No.: 12/590,638

(22) Filed: Nov. 12, 2009

(65) Prior Publication Data

US 2011/0107715 A1    May 12, 2011

(51) Int. Cl.
*E04B 1/00* (2006.01)
*E02D 35/00* (2006.01)

(52) U.S. Cl.
USPC ............. 52/506.05; 52/125.1; 52/125.5; 52/8

(58) Field of Classification Search
USPC ................ 52/39, 123.1, 125.1, 125.2, 125.4, 52/125.5, 126.1, 126.2, 126.3, 126.4, 52/126.5, 126.7, 365, 366, 367, 368, 369, 52/370, 372, 373, 374, 375, 376, 377, 699, 52/700, 701, 703, 704, 706, 707, 708, 709, 52/711, 506.05; 248/314, 343, 534, 535, 248/342; 403/348, 350; 521/39, 123.1, 521/125.1, 125.2, 125.4, 125.5, 126.1, 521/126.2, 126.3, 126.4, 126.5, 126.7, 365, 521/366, 367, 368, 369, 370, 372, 373, 374, 521/375, 376, 377, 699, 700, 701, 703, 704, 521/706, 707, 708, 709, 711

See application file for complete search history.

(56) References Cited

U.S. PATENT DOCUMENTS

| | | | | |
|---|---|---|---|---|
| 1,098,250 A | * | 5/1914 | Gonia .............................. | 248/58 |
| 1,141,554 A | * | 6/1915 | Klumpp .......................... | 52/711 |
| 1,264,189 A | * | 4/1918 | Keator ............................ | 52/105 |
| 2,256,961 A | * | 9/1941 | Pearson et al. ................ | 52/407.4 |
| 4,030,261 A | * | 6/1977 | Coleman ........................ | 52/511 |
| 4,157,001 A | * | 6/1979 | Pickles ...................... | 52/506.02 |
| 4,261,598 A | * | 4/1981 | Cornwall ........................ | 285/56 |
| 4,459,785 A | * | 7/1984 | Zimmer ........................ | 451/398 |
| 4,499,698 A | * | 2/1985 | Hoyt et al. ...................... | 52/157 |
| 4,507,069 A | * | 3/1985 | Murray et al. ................ | 405/230 |
| 4,842,465 A | * | 6/1989 | Pease et al. .................... | 411/337 |
| 5,011,353 A | * | 4/1991 | Boyd ............................ | 411/383 |
| 6,240,697 B1 | | 6/2001 | Thompson | |
| 6,872,054 B2 | * | 3/2005 | Pearce ...................... | 416/244 R |
| 7,527,232 B2 | * | 5/2009 | Frampton et al. ............. | 248/343 |
| 8,439,593 B2 | * | 5/2013 | Slater et al. .................... | 403/361 |
| 2002/0172550 A1 | * | 11/2002 | Uhler et al. .................... | 403/348 |
| 2006/0255226 A1 | * | 11/2006 | Frampton et al. ............. | 248/343 |
| 2013/0104483 A1 | * | 5/2013 | Hensley et al. ................ | 52/466 |

FOREIGN PATENT DOCUMENTS

DE    3229911 A1 *  2/1984

* cited by examiner

*Primary Examiner* — Brian Glessner
*Assistant Examiner* — Joseph J Sadlon
(74) *Attorney, Agent, or Firm* — Tope-McKay & Associates

(57) ABSTRACT

A ceiling anchoring device with a locking rail system is disclosed. The device comprises an anchor having a shaft, a head attached with an end of the shaft, and a rail system. The rail system comprises rod and pin insertion rails, a turning space, and a locking rail. A rod having a perpendicular pin is inserted into the rod and pin insertion rails and pushed along the shaft until the rod and pin enter the turning space in the shaft. The rod and pin can then be turned one-quarter turn and be lowered into the locking rail, whereby the rod and pin are retained in the shaft of the anchor. A plug and cap are inserted into the turning space to secure the rod and pin within the locking rail.

13 Claims, 6 Drawing Sheets

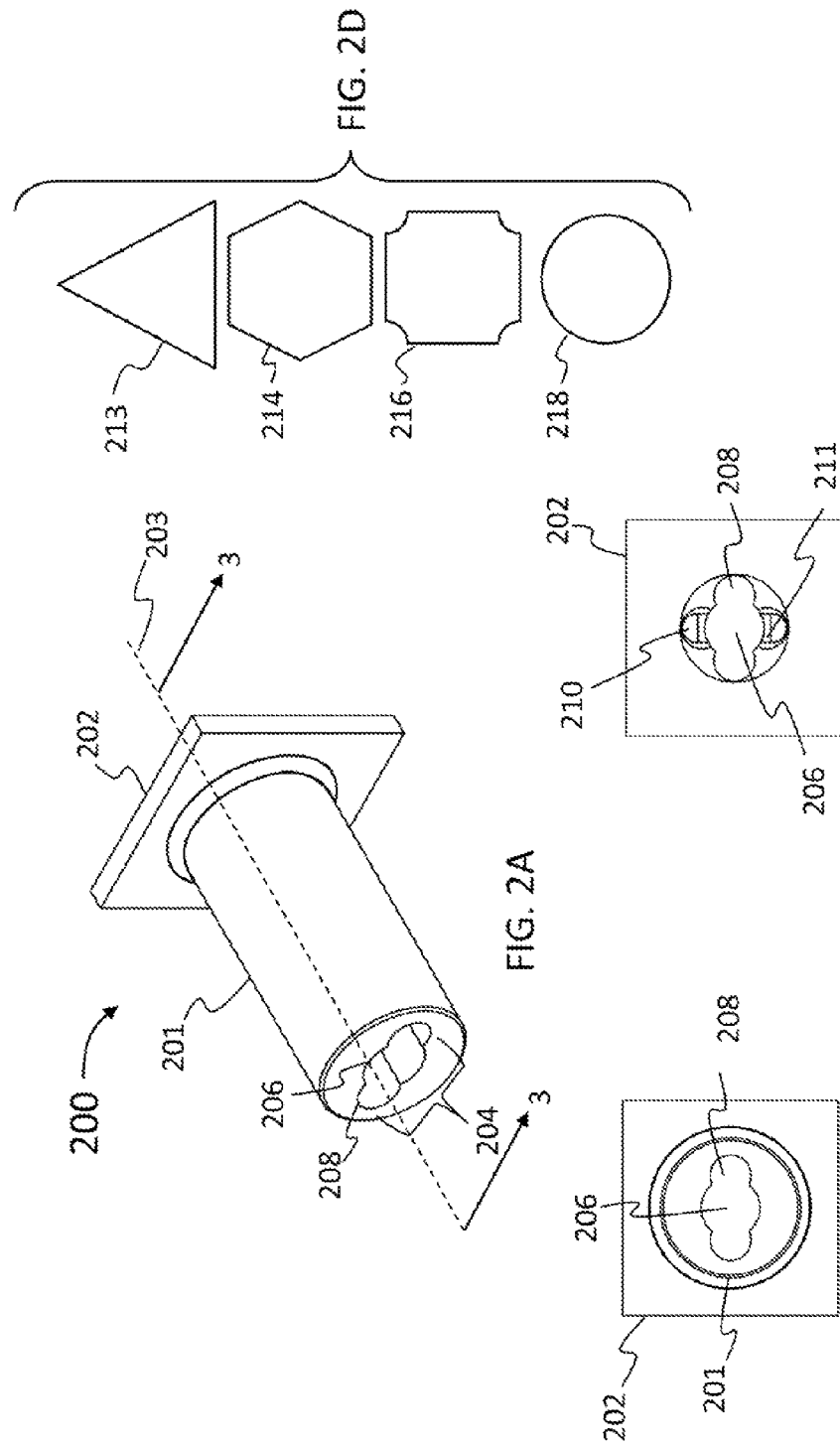

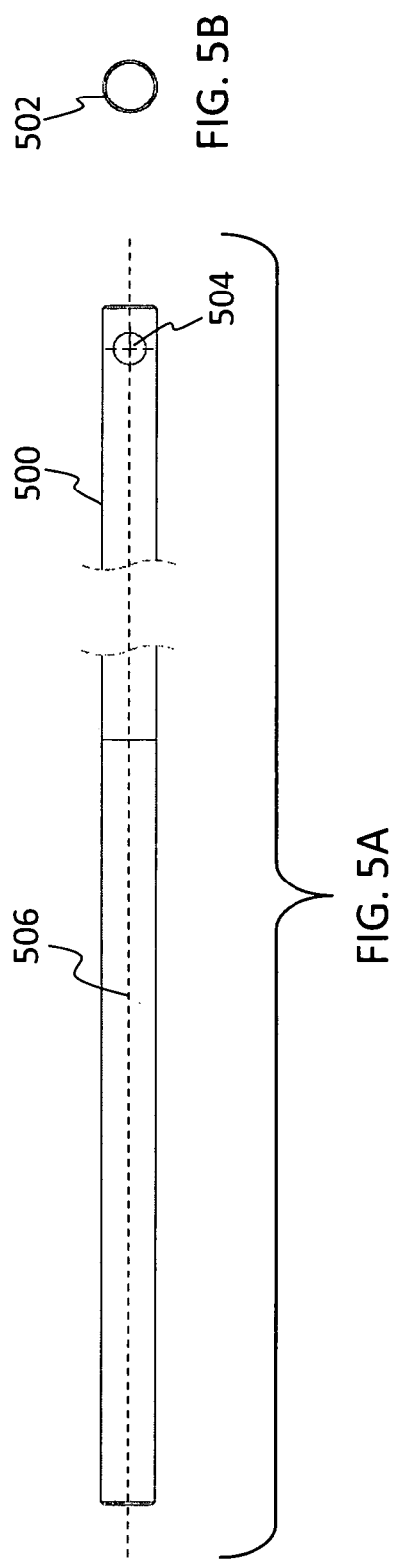

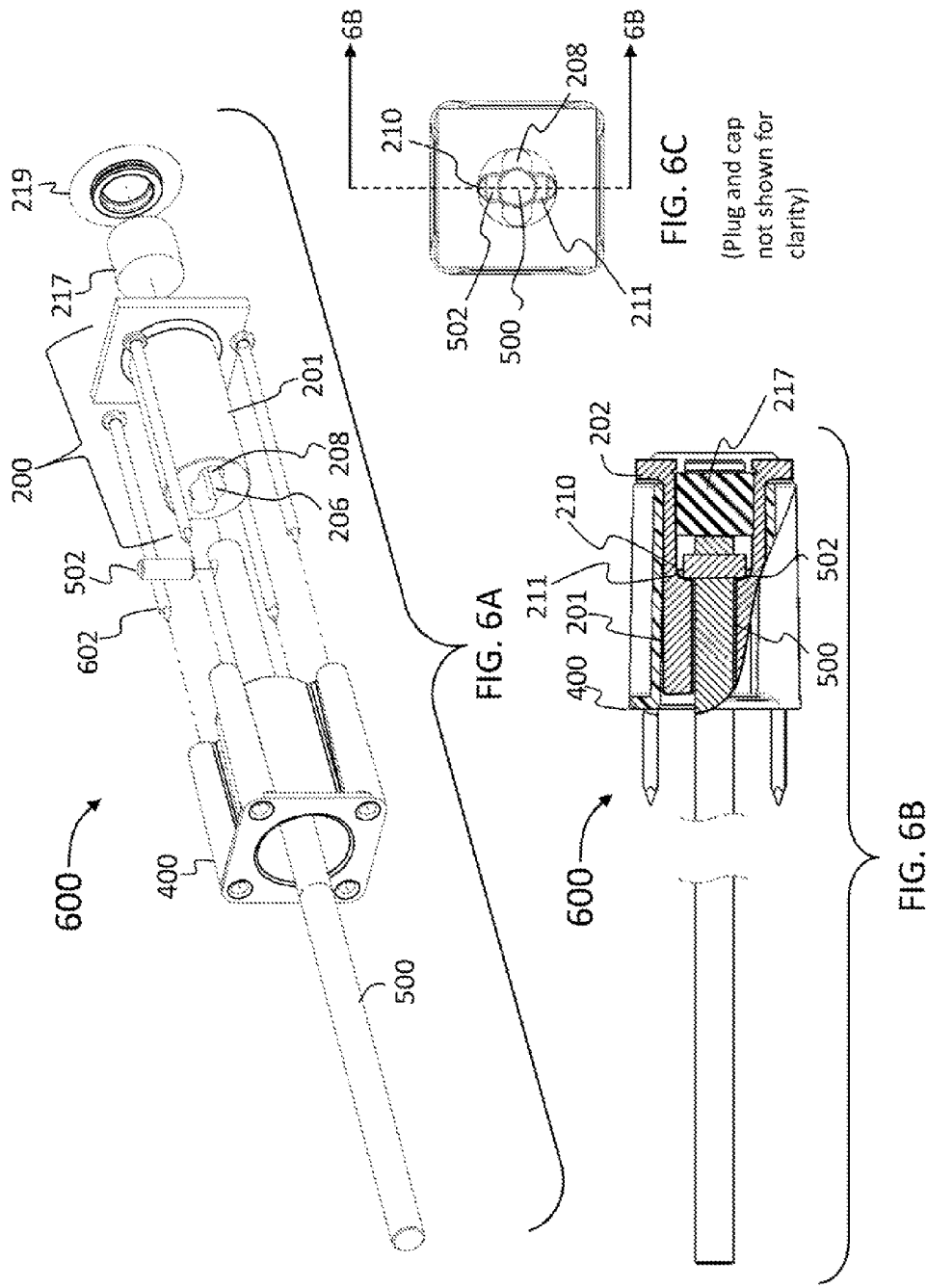

CEILING ANCHORING DEVICE WITH LOCKING RAIL SYSTEM

BACKGROUND OF THE INVENTION (1) Field of Invention

The present invention relates to a ceiling anchoring device and, more particularly, to a ceiling anchoring device which incorporates a locking rail system for selectively retaining an anchoring rod for hanging items from a ceiling or other overhanging structure.

(2) Description of Related Art

Ceiling anchoring devices have long been used in the art of construction to hang plumbing, lighting, and other fixtures from building ceilings. A common class of devices used in the art comprises an anchor having a head and a threaded shaft. A nail guide surrounds the shaft for nailing or pushing the anchor into a pre-concrete framework such as wood, metal, etc. Concrete is then laid over the anchor. When the pre-concrete framework is removed from the underside of the concrete, the threaded shaft of the anchor is exposed, whereby a rod having a threaded end can be screwed into the anchor, providing a hanging point for pipes, lighting, etc.

Current devices of this class have two major problems. First, it is typical for portions of concrete to get stuck in the threading of the shaft. Removing the concrete is labor intensive, often requiring repeated manipulation of the anchoring rod within the shaft to knock away the concrete, which substantially drives up the labor costs of projects using these types of devices. A second problem is that most of these anchoring devices have a circular head, which allows the anchor to rotate within the concrete, thereby reducing stability of the anchor as well as making it more difficult to screw the threaded rod into the moving anchor.

A specific ceiling anchoring device used in the art is marketed under the trademark BLUE BANGER HANGER®, and generically known as the same, produced by Simpson Manufacturing, 5956 W. Las Positas Blvd., Pleasanton, Calif. 94588, USA, (925) 560-9000, and at http://www.simpsonanchors.com/catalog/mechanical/blue-banger/index.html. The BLUE BANGER HANGER® is also protected by U.S. Pat. No. 6,240,697 B1 (hereinafter, the '697 patent). This product has a circular head and a threaded shaft. The key feature disclosed in the '697 patent is a threaded shaft having a plurality of diameters, allowing insertion of anchoring rods of different diameters. This device exhibits the problems associated with residual concrete obstructing the threading of the shaft, as well as unwanted rotation of the anchor within the concrete.

Another related anchoring device currently used in the art is sold under the trade name WOOD KNOCKER™, and generically known as the same, produced by Powers Fasteners, Inc, 2 Powers Lane, Brewster, NY 10509, (914) 235-6300, and at http://www.powers.com/. The WOOD KNOCKER™ has a hexagonally shaped head, which reduces the degree of unwanted rotation of the anchor within the concrete, but still uses a threaded shaft, and exhibits the problems associated with residual concrete obstructing the threading of the shaft.

Thus, a continuing need exists for a ceiling anchoring device which allows for fast and easy installation of overhanging items, easy removal of unwanted concrete from within the attachment shaft, and which will not shift or rotate within the ceiling substrate.

SUMMARY OF INVENTION

The present invention relates to a ceiling anchoring device and, more particularly, to a ceiling anchoring device which incorporates a locking rail system for selectively retaining an anchoring rod for hanging items from a ceiling or other overhanging structure. A first aspect of the device comprises a shaft, a head attached with an end of the shaft, and a rail system formed on an interior surface of the shaft and disposed within the shaft. The rail system comprises three rails: a rod insertion rail, a pin insertion rail, and a locking rail. The rod insertion rail runs parallel to the longitudinal axis of the shaft, configured such that a rod may be inserted into the shaft. The pin insertion rail also runs parallel to and is disposed about the longitudinal axis of the shaft and alongside the rod insertion rail, configured such that a rod having a protruding pin may be inserted into the shaft. A turning space within the shaft is configured such that a rod having a pin that has been inserted into the shaft via the rod and pin insertion rails will be able to rotate freely along the longitudinal axis of the shaft when a portion of the rod having the pin reaches the turning space. The locking rail extends perpendicular to the longitudinal axis of the shaft and alongside the rod insertion rail, configured such that when a portion of a rod having a pin reaches the turning space, the rod can be turned along the longitudinal axis of the shaft and the pin then inserted into the locking rail, whereby the rod and pin are retained in the shaft by the locking rail.

In another embodiment, the device further comprises a plug configured to fit within the turning space of the anchor such that an anchoring rod and pin resting within the locking rail is secured within the locking rail by obstruction of the turning space by the plug.

In yet another aspect, the device further comprises a cap for retaining the plug within the turning space. This cap also acts as a seal to insure concrete does not enter the turning space when concrete is poured over the device.

In another aspect, the device further comprising a nail guide configured fit around the shaft of the anchoring device and to house and orient a plurality nails parallel with the shaft and facing away from the head of the device, whereby the device can be attached with a substrate by striking the head of the device and driving the nails into the substrate.

In a further aspect, the device of the present invention also comprises a plurality of nails housed by the nail guide. In a desired embodiment, the nail guide houses four nails.

In another aspect of the device, the head of the anchor has a shape selected from the group consisting of square, circular, hexagonal, triangular, and square with notched corners.

Another aspect of the present invention is an anchoring rod for use with the aforementioned anchoring device, the rod having a longitudinal axis and a hole through the rod perpendicular to the longitudinal axis for retention of a pin.

In a final aspect, the device further comprises a pin configured to reside within the hole in the rod and further configured to protrude from the hole such that the rod and pin can be retained by a locking rail system of the anchoring device.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1A is an illustration of a prior art anchoring device;

FIG. 1B is an illustration of a prior art anchoring device with nail guide;

FIG. 1C is an illustration of a prior art anchoring device with nail guide and hexagonally shaped head;

FIG. 2A is a perspective view illustration of an anchor in accordance with the present invention;

FIG. 2B is a bottom view illustration of an anchor in accordance with the present invention, showing the rod insertion and pin insertion rails;

FIG. 2C is a top view illustration of an anchor in accordance with the present invention; showing the rod insertion, pin insertion, and locking rails;

FIG. 2D is a top view illustration of exemplary head shapes for use with present invention;

FIG. 5A is an illustration showing an anchoring rod according to the present invention;

FIG. 5B is an illustration showing a pin for use with an anchoring rod according to the present invention;

FIG. 6A is a perspective view illustration showing a complete assembly of the anchoring device of the present invention;

FIG. 6B is a cross sectional view illustration of a complete assembly of the anchoring device of the present invention; and FIG. 6C is a top view illustration showing a rod and pin residing in the locking rail according to the present invention.

DETAILED DESCRIPTION

The present invention relates to a ceiling anchoring device and, more particularly, to a ceiling anchoring device which incorporates a locking rail system for selectively retaining an anchoring rod for hanging items from a ceiling or other overhanging structure. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

The present invention relates to a ceiling anchoring device and, more particularly, to a ceiling anchoring device which incorporates a locking rail system for selectively retaining an anchoring rod for hanging items from a ceiling or other overhanging structure.

Figure 1C:
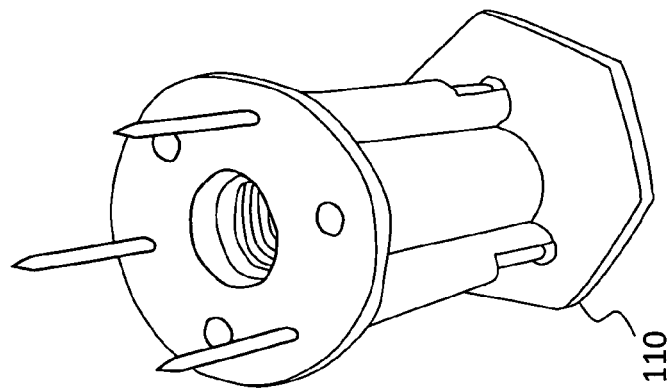
Figure 1B:
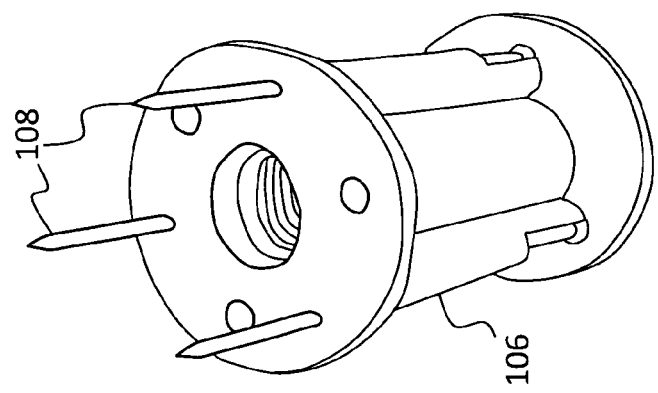
Figure 1A:
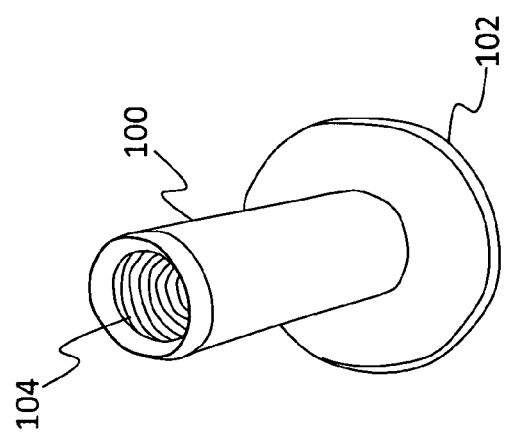

FIGS. 1A-1C shows prior art ceiling anchoring devices. These devices generally comprise an anchoring portion (in FIG. 1A) having an anchor shaft 100 and a head 102, the shaft 100 containing internal threading 104 for insertion of a similarly threaded anchoring rod. A nail guide 106 (in FIG. 1B) housing a plurality of nails 108 surrounds the anchor shaft 100. The nail guide 106 and nails 108 allow the device to be pushed or hammered into a pre-concrete framework such as wood, metal, etc. prior to pouring of concrete over the device. The nails 108 are later sheared off when the pre-concrete framework is removed from the dried concrete, leaving the exposed threaded shaft 104 for attachment of pipes, lighting, or other ceiling fixtures. FIG. 1C shows a similar prior art ceiling device which uses a hexagonally shaped head portion 110. Examples of specific devices sold on the market similar to those shown in FIGS. 1A-1C are described in the Background of Invention section, above.

FIG. 2A shows a perspective view of an anchoring device anchor 200 in accordance with the present invention. The device anchor 200 comprises a shaft 201, a head 202 attached with an end of the shaft, and a rail system 204 extending along a longitudinal axis 203 formed on an interior surface of the shaft 201 and disposed within the shaft 201. The rail system comprises three rails: a rod insertion rail 206, a pin insertion rail 208, and a locking rail 210 (shown in FIG. 2C). FIG. 2B shows a bottom view of the device, from which the rod insertion rail 206 and pin insertion rails 208 are visible. FIG. 2C shows a top view (head-on view) of the device where the rod insertion rail 206, pin insertion rails 208, and locking rails 210 are all visible. As can be seen from this view, the pin insertion rails 208 and the locking rails 210 are configured perpendicularly to one another. Note that because the rod and pin insertion rails do not contain threading, there is a reduced chance of concrete becoming stuck in the shaft of the anchor. Furthermore, if concrete does become stuck in the shaft, it can be removed by a simple thrusting of the rod into the shaft, thereby saving vast amounts of labor time compared with the threaded shafts of the prior art.

The device shown in FIGs, 2A-2C has a square head 202, The square head shape is easy to manufacture and also prevents the device from rotating after being surrounded by concrete. As can be appreciated by one skilled in the art, the present invention can be constructed with any of a variety of head shapes. FIG. 2D illustrates non-bruiting examples of various head shapes for use with the present invention, including triangular 213, hexagonal 214, square with notched corners 216, and circular 218.

Figure 3:
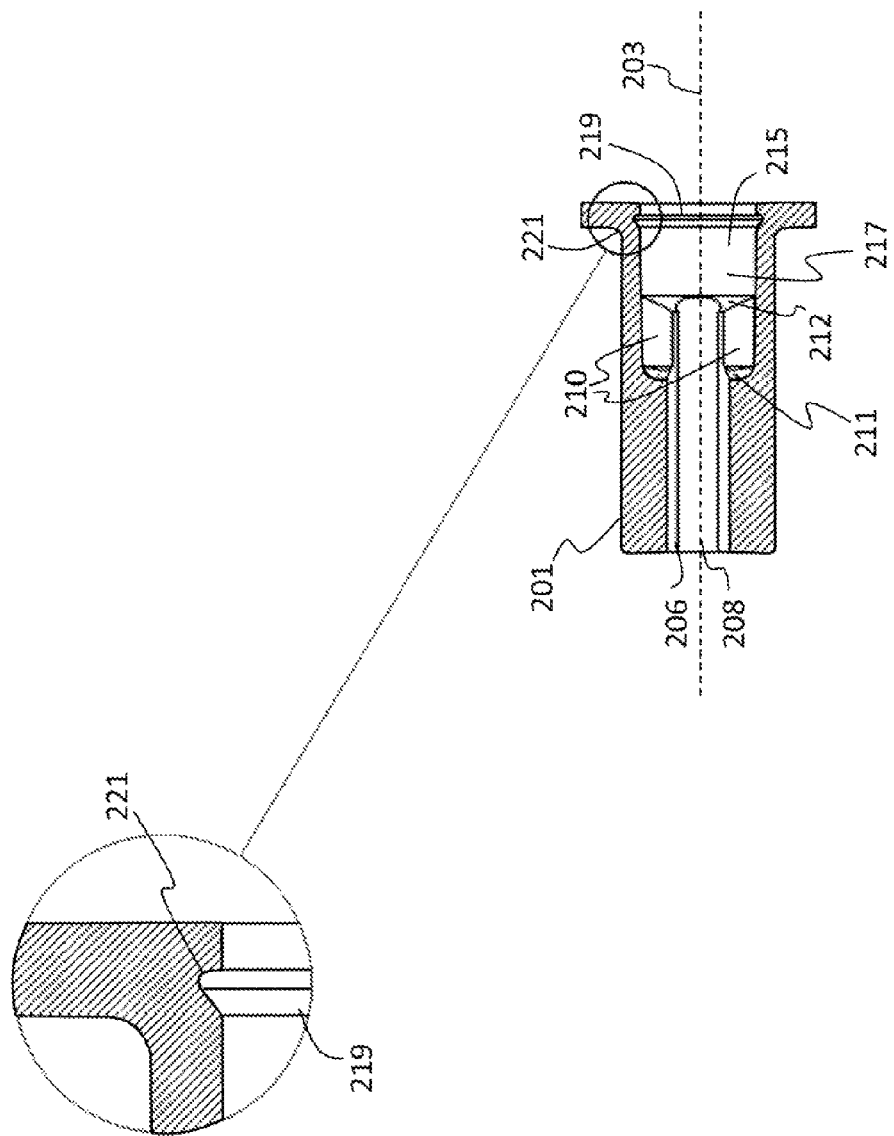
FIG. 3 is cross sectional view illustration of an anchor in accordance with the present invention, with a blown-up section showing the cap fitting with the anchor shaft.

Another view of the internal rail system is depicted in the cross-sectional view of FIG. 3. Note, in this figure, the rod insertion rail 206 and the pin insertion rails 208 lay in the same plane. The rod insertion rail 206 runs parallel to the longitudinal axis 203 of the shaft 201, and is configured such that a rod (see FIG. 5 for rod and FIGs, 6A-6C for complete assembly) may be inserted into the shaft via the rod insertion rail. The pin insertion rail 208 also runs parallel to and is disposed about the longitudinal axis 203 of the shaft and alongside the rod insertion rail 206 (see FIG. 2A for further clarity). The pin insertion rail 208 is configured such that a rod having a protruding, pin may be inserted into the shaft via the pin insertion rail 208. The locking rail 210 runs parallel to the longitudinal axis 203 of the shaft 201, extends perpendicular to and alongside the rod insertion rail 206, and is arranged perpendicular to offset from the pin insertion rail 208 if viewed head-on (see FIG, 2C). Unlike the rod insertion rail 206, and pin insertion rail 208, the locking rail 210 does not run the length of the shaft 201, as it is configured to prevent an engaged rod and pin from exiting the shaft 201. The locking rail 210 comprises a pin retention guide 211, which engages the pin to prevent the rod from rotating back so that the pin cannot regain alignment with the pin insertion rail 208.

Still referring to FIG. 3, the device further comprises a turning space (free space) 215 within the shaft 201. Note that in this figure, most of the volume of the turning space 215 is occupied by a plug 217, discussed below. The turning space 215 defines a volume within the shaft 201 accessible by all three rails 206, 208, and 210. The turning space 215 is configured such that a rod having a pin that has been inserted into the shaft via the rod and in insertion rails 206 and 208 will be able to rotate freely along the longitudinal axis 203 of the shaft when a portion of the rod having the pin reaches the turning, space 215. When a rod enters the turning space 215, it can be rotated one-quarter turn, such that the pin which was previously aligned with the pin insertion rail 208 (see FIG. 2C for clarity) is now aligned with the locking rail 210. The rod and pin can then be lowered out of the turning space 215 (FIG. 3) and into the locking rail 210 where the rod and pin is retained within the shaft 201. As shown in FIGS. 2C and 3, and later in FIGS. 6B and 6C, the locking rail 210 comprises a pin retention guide 211 in which the rod fits, which serves to retain the rod and pin within the shaft 201 by preventing rotation and release thereof. Thus, the pin retention guide 211 serves to prevent fixtures attached with the rod and pin from detaching from the structure and falling to the floor. The pin retention guide 211 depicted in the figures is shown as a recess that the pin fits into upon rotation. The recess may take any desired shape, preferably a shape that mates and fits securely with the shape of the pin (e.g., a circular groove in the case of a round pin or a square notch in the case of a square pin).

Still referring to FIG. 3, a plug 217 can be inserted within the turning space 215 such that an anchoring rod and pin resting within the locking rail 210 is secured within the locking rail by obstruction of the turning space 215 by the plug 217. The plug 217 helps to press the pin into the pin retention guide 211 of the locking rail 210, thus further securing the rod and pin against rotation. The plug 217 may be secured in the turning space 215 by a cap 219 which rests within a circumferential notch 221 within the interior of the shaft, as shown in the blown-up window of FIG. 3. This cap 219 also acts as a seal to ensure that concrete does not enter the turning space 215 when concrete is poured over the device. In a desired embodiment, the plug 217 is made of a flexible material such as, but not limited to, rubber, so that a rod and pin may be selectively pushed into and out of the turning space 215 against the force of the plug 217 when desired, yet retained in the locked position by the plug 217 during normal operation of the anchor.

Figure 4B:
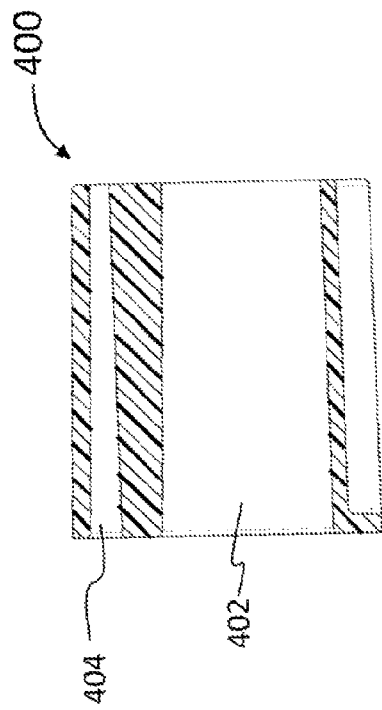
FIG. 4B is a cross sectional side view illustration of a nail guide for use with the present invention.
Figure 4C:
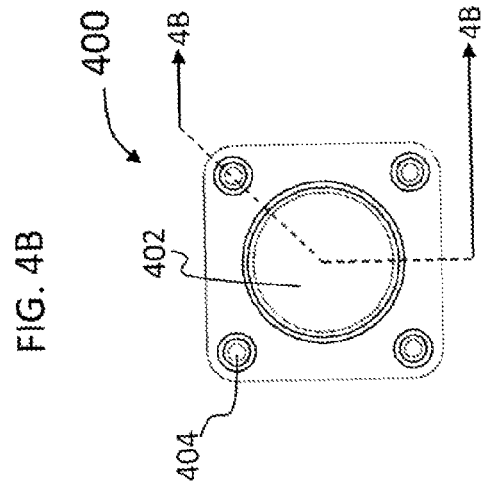
FIG. 4C is a top view illustration of a nail guide for use with the present invention.
Figure 4A:
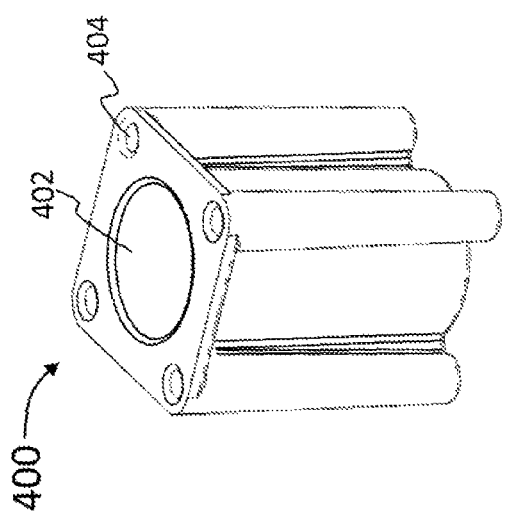
FIG. 4A is a perspective view illustration of a nail guide for use with the present invention.

The present invention may further comprise a nail guide as shown in FIGS. 4A-4C. The nail guide 400 has a central cavity 402 and is configured to fit around the shaft of the anchor (see FIGS. 6A-6C for complete assembly). The nail guide also has a plurality of nail recesses 404 to house and orient a plurality nails parallel with the shaft and facing away from the head of the device (see FIGS. 6A-6C), whereby the device can be attached with a substrate by striking the head of the device and driving the nails into the substrate. In the non-limiting example shown in FIGS. 4A-4C, the nail guide houses four nails compared to the three-nail guide of the prior art (FIGS. 1B and 1C) to provide additional strength and security when hammered into the framework. FIG. 4A is a perspective view of the nail guide 400. FIG. 4B is a side cross sectional view, showing the central cavity 402 and nail recesses 404. FIG. 4C is a top side view of the nail guide 400.

The components of an anchoring rod 500 and pin 502 assembly for use with the present invention are shown in FIGS. 5A and 5B. The rod 500 contains a hole 504 for retaining the pin 502, such that the pin protrudes perpendicularly from a longitudinal axis 506 the rod and provides the support surface which anchors the rod and pin assembly in place when engaged with the locking rail.

FIG. 6A shows a perspective view of a complete assembly 600 of the present invention. The anchor 200 is fitted with a plug 217 and cap 219. A plurality of nails 602 are housed within the nail guide 400 and fitted around the shaft 201 of the anchor 200, An anchoring rod 500 having a pin 502 can be inserted into the shaft 201 via the rod and pin insertion rails 206 and 208.

A cross section of the complete assembly 600 of the device in a locked position is shown in FIG. 6B. In the assembled device, the nail guide 400 fits snugly around the anchor shaft 201 and adjacent to the head 202 of the anchor. The plug 217 occupies the turning space 215 (shown in FIG. 3) and restricts the rod 500 and pin 502 assembly from leaving the locking rail 210.

Finally, FIG. 6C shows a top view of the complete assembly in a locked position with the plug and cap omitted for clarity. The rod 500 and pin 502 assembly rests within the locking rail 210 and are prevented from dislodging and re-entering the pin insertion rail 208 by the downward force of the plug (not shown for clarity, see FIG. 6B).

What is claimed is:

1. An anchoring device, comprising:
a shaft;
a head attached with an end of the shaft; and
a rail system formed on an interior surface of the shaft and disposed within the shaft, the rail system comprising:
a rod insertion rail running parallel to a longitudinal axis of the shaft, configured such that a rod may be inserted into the shaft;
a pin insertion rail running parallel to and disposed about the longitudinal axis of the shaft and alongside the rod insertion rail, configured such that a rod having a protruding pin may be inserted into the shaft;
a turning space within the shaft, configured such that a rod having a pin that has been inserted into the shaft via the rod and pin insertion rails will be able to rotate freely along the longitudinal axis of the shaft when a portion of the rod having the pin reaches the turning space; and
a locking rail comprising a surface having a pin retention guide disposed on a portion thereof, extending perpendicular to the longitudinal axis of the shaft and alongside the rod insertion rail, configured such that when a portion of a rod having a pin reaches the turning space, the rod can be turned along the longitudinal axis of the shaft and the pin then coupled with the pin retention guide of the locking rail, whereby the rod and pin are retained in the shaft by the locking rail, with the pin retention guide preventing the rod and pin from rotating in a plane perpendicular to the shaft.

2. The device of claim 1, further comprising a plug configured to fit within the turning space such that an anchoring rod and pin resting within the locking rail is secured within the locking rail by obstruction of the furning space by the plug.

3. The device of claim 2, further comprising a cap for retaining the plug within the turning space.

4. The device of claim 3, further comprising a nail guide configured to fit around the shaft of the anchoring device and to house and orient a plurality of nails parallel with the shaft and facing away from the head of the device, whereby the device can be attached with a substrate by striking the head of the device and driving the nails into the substrate.

5. The device of claim 4, further comprising a plurality of nails housed by the nail guide.

6. The device of claim 5, wherein the nail guide houses four nails.

7. The device of claim 6, further comprising an anchoring rod having a pin for being functionally retained by the rail system of the anchoring device.

8. The device of claim 7, wherein the head of the anchoring device has a shape selected from the group consisting of square, circular, hexagonal, triangular, and square with notched corners.

9. The device of claim 1, further comprising a nail guide configured to fit around the shaft of the anchoring device and to house and orient a plurality of nails parallel with the shaft and facing away from the head of the device, whereby the device can be attached with a substrate by striking the head of the device and driving the nails into the substrate.

10. The device of claim 9, further comprising a plurality of nails housed by the nail guide.

11. The device of claim 10, wherein the nail guide houses four nails.

12. The device of claim 1, further comprising an anchoring rod having a pin for being functionally retained by the rail system of the anchoring device.

13. The device of claim 1, wherein the head of the anchoring device has a shape selected from the group consisting of square, circular, hexagonal, triangular, and square with notched corners.

* * * * *